United States Patent
Sayyed et al.

(10) Patent No.: US 12,306,685 B2
(45) Date of Patent: May 20, 2025

(54) EMBEDDED CONTROLLER TO ENHANCE DIAGNOSIS AND REMEDIATION OF POWER STATE CHANGE FAILURES

(71) Applicant: DELL PRODUCTS L.P., Round Rock, TX (US)

(72) Inventors: Ibrahim Sayyed, Georgetown, TX (US); Adolfo Montero, Pflugerville, TX (US); Amit Tiwari, Austin, TX (US); Anand Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 18/339,818

(22) Filed: Jun. 22, 2023

(65) Prior Publication Data

US 2024/0427398 A1    Dec. 26, 2024

(51) Int. Cl.
*G06F 1/28* (2006.01)
*G06F 1/30* (2006.01)
*G06F 1/32* (2019.01)
*G06F 1/3206* (2019.01)
*G06F 1/3215* (2019.01)
*G06F 9/4401* (2018.01)
*G06F 11/07* (2006.01)

(52) U.S. Cl.
CPC .............. *G06F 1/28* (2013.01); *G06F 1/30* (2013.01); *G06F 1/32* (2013.01); *G06F 1/3206* (2013.01); *G06F 1/3215* (2013.01); *G06F 9/4418* (2013.01); *G06F 11/0766* (2013.01)

(58) Field of Classification Search
CPC ........ G06F 1/3206; G06F 1/3215; G06F 1/28; G06F 1/30; G06F 1/32; G06F 9/4418; G06F 11/0766
USPC .............................. 713/300, 323; 714/44, 48
See application file for complete search history.

(56) References Cited

U.S. PATENT DOCUMENTS

| | | |
|---|---|---|
| 11,500,449 B1 | 11/2022 | Suryanarayama et al. |
| 2010/0312946 A1* | 12/2010 | Bold ...................... G06F 1/3275 711/E12.001 |
| 2011/0037993 A1* | 2/2011 | Lee ........................ G06F 9/4418 358/1.14 |
| 2012/0210032 A1* | 8/2012 | Wang ...................... G06F 13/24 710/260 |
| 2012/0272103 A1* | 10/2012 | Calinoiu ............. G06F 11/3688 714/47.1 |
| 2021/0034132 A1 | 2/2021 | Hamlin et al. |

* cited by examiner

*Primary Examiner* — Ji H Bae
(74) *Attorney, Agent, or Firm* — Larson Newman, LLP

(57) ABSTRACT

An information handling system includes a storage and an embedded controller. The storage stores context data associated with a standby mode for the information handling system. The embedded controller receives the context data from a host operating system of the information handling system. The context data includes data associated with a software deepest runtime identification platform state. The embedded controller further stores the context data in the storage. In response to a restart of the information handling system, the embedded controller determines a device driver that prevented the information handling system from exiting the standby mode based on the context data, and provides an identifier of the device driver a software service of the host operating system.

20 Claims, 6 Drawing Sheets

EMBEDDED CONTROLLER TO ENHANCE DIAGNOSIS AND REMEDIATION OF POWER STATE CHANGE FAILURES

FIELD OF THE DISCLOSURE

The present disclosure generally relates to information handling systems, and more particularly relates to an embedded controller to enhance diagnosis and remediation of power state change failures.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a storage and an embedded controller. The storage may store context data associated with a standby mode for the information handling system. The embedded controller may receive the context data from a host operating system of the information handling system. The context data includes data associated with a software deepest runtime identification platform state. The embedded controller may further store the context data in the storage. In response to a restart of the information handling system, the embedded controller may determine a device driver that prevented the information handling system from exiting the standby mode based on the context data, and provide an identifier of the device driver a software service of the host operating system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
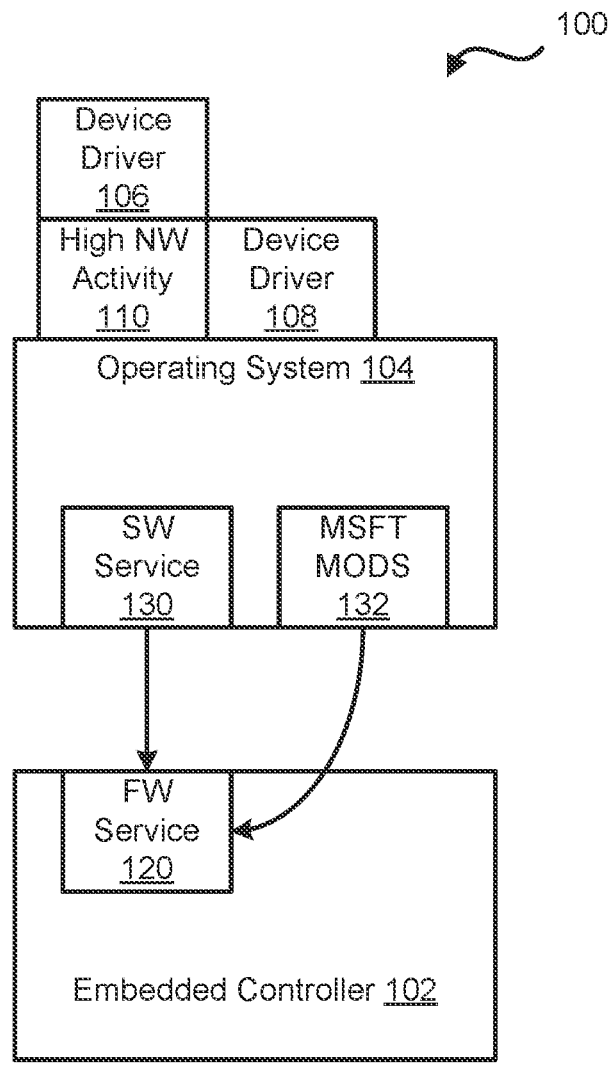
FIG. 1 is a block diagram of a portion of an information handling system according to at least one embodiment of the present disclosure.

FIG. 1 illustrates an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 6:
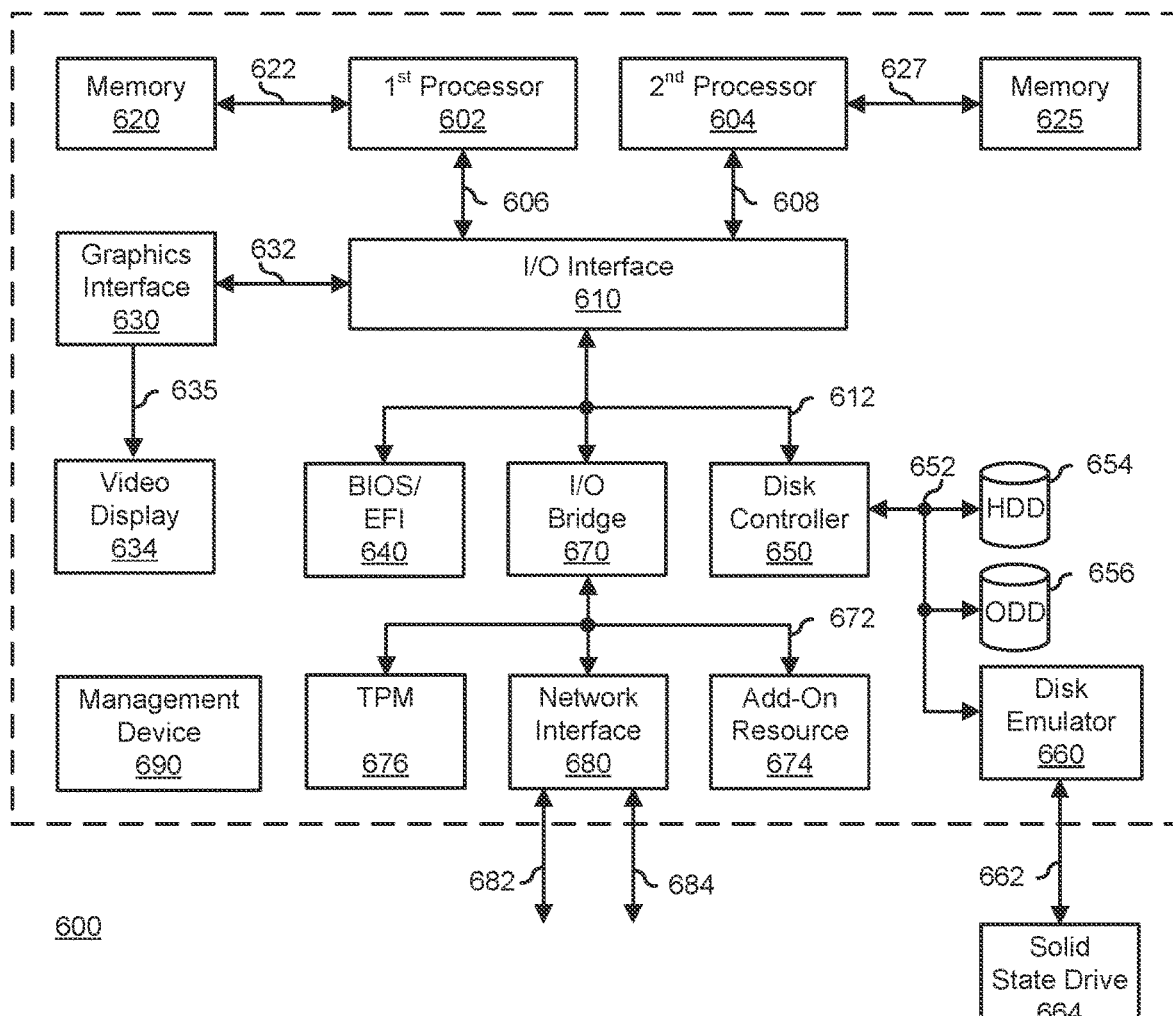
FIG. 6 is a block diagram of a general information handling system according to an embodiment of the present disclosure.

Information handling system 100 includes an embedded controller 102 and multiple components to be executed by a processor, such as processor 602 or 604 of FIG. 6. In an example, the components may include, but are not limited to, an operating system (OS) 104, device drivers 106 and 108 and monitoring of high network activity 110. Embedded controller 102 includes a firmware service 122. OS 104 may include a software service 130 and a modern standby (MODS) 132. Information handling system 100 may include any suitable number of additional components or information handling systems without varying from the scope of this disclosure.

In an example, information handling system 100 may transfer from a fully on and operational state, such as a S0 power state, to a low power state, such as S1-S5 power states. In an example, the S1-S4 power states are different sleeping states, and the S5 power state is a power off state. In certain examples, when information handling system 100 transfers to a low power state, OS 104 may enter MODS 132. For example, information handling system 100 may be a laptop computer and when the lid is closed the OS 104 may enter MODS 132. Additionally, as information handling system 100 transfers back to the power on state, OS 104 may exit MODS 132. In certain examples, entry into or out of MODS 132 may fail for any suitable reason. For example, failure of MODS 132 may be caused by one or both of device drivers 106 and 108 being bad. In another situation, information handling system 100 may fail to wake up from MODS 132 due to incorrect wake configuration settings, hardware signal failure, or the like.

Previous information handling systems may include a MODS-capable system BIOS that may expose a platform agnostic device object (_DSM). The OS of these information handling systems may utilize _DSM to notify the platform/ EC firmware of entry/exit of MODS. While the previous information handling systems notify the EC firmware of entry/exit of MODS, _DSM does not provide any further context around the MODS entry/exit conditions. However, the previous information handling systems do not track a software deepest runtime identification platform state (drips) during these power transitions, nor deeper sleep states within MODS.

The previous information handling systems do not include EC tracking with respect to the SW drips context. Having Dell EC and Dell SW SVC makes it a unique combination to improve customer experience at the bare-metal level with native MODS triage built into the EC/SBIOS. Previous information handling systems do not track and remember the critical SW drips states when the OS transitions in/out of MODS.

Information handling system 100 may be improved by a bare metal firmware service, such as firmware service 120 of EC 102, to granularly track power state changes with respect to power state transitions of OS 104. Information handling system 100 also may be improved by EC 102 notifying a host which OS components might be blocking entry into MODS 132. In certain examples, EC 102 may track/log of the SW drips state as a bare metal service, such as via firmware service 120. EC 102 may also extend _DSM to attach full state context relevant to power state transition critical information. Additionally, one or more components, such as EC 102 or a BIOS, of information handling system 100 may perform one or more operations to automatically fix device driver 106 or 108 that may break SW drips.

In an example, OS 104 may provide entry/exit of MODS 132 notifications to EC 102 via any suitable manner. For example, OS 104 may provide data associated with entry/ exit of MODS 132 via _DSM firmware notifications to firmware service 120 of EC 102. In certain examples, software service 130 of OS 104 may provide OS telemetry data and SW drips data to firmware service 120 via any suitable communication protocol, such as memory mapped input/output (MMIO) communication protocol.

In an example, OS 104 may be associated with a host processor, such as processor 602 or 604 of FIG. 6. EC 102 may include or be in physical communication with a memory, such as storage 208 of FIG. 2. In an example, the memory may be a SPI flash memory or the like. In certain examples, EC 102 may receive critical power state transition data from OS 104 in any suitable manner. For example, the power state transition data may be received from software service 130, MODS 132, or the like. Based on the reception of the power state transition data, EC 102 may write the critical power state transition details as a telemetry log in a memory of information handling system 100, such as storage 208 of FIG. 2, memory 620 of FIG. 6, memory 625 of FIG. 6, or the like. In an example, EC 102 may be able to more granularly store the host OS power state transition details. EC 102 may capture key wake configuration details to track failures more granularly for exit from MODS 132.

In certain examples, EC 102 may track any suitable data notifications including, but not limited to, a display on notification, a display off notification, a lowest power state entry notification, a lowest power state exit, a MOD entry notification, and a MOD exit notification. In an example, the display off notification may be provided in response to a lid being closed, a dialog box, a timeout function, a soft sleep button being selected or the like. In certain examples, the display off notification may be a _DSM function that may be invoked when OS 104 has entered a state where all displays, such as local or remote, have been turned off.

The display on notification may be provided based on an activity that may cause the information handling system to wake, such as a mouse activity, a keyboard activity, or the like. In an example, the display on notification may be _DSM function invoked if a display off notification has occurred and any display, such as local or remote, has returned to an active state.

In an example, the lowest power state entry notification may indicate a NIC state during the entry, information similar to drips for devices that may block lower power states within MODS, or the like. The lowest power state entry notification is a _DSM function that may occur during MODS and may be invoked when all software activity has ceased allowing information handling system 100 to enter its lowest power state. Information handling system 100 may enter and exit this state several times during a MODS session to service explicitly allowed user-desired behaviors.

In certain examples, the lowest power state exit notification may indicate details for devices that may bring the OS out of a deepest sleep state into the MODS. The lowest power state exit notification is a _DSM function that may occur during MODS that may be invoked whenever information handling system 100 wakes from the lowest power state to run software activity. Information handling system 100 may enter and exit this several times during a MODS session to service explicitly allowed user-desired behaviors.

The MODS entry notification may include detailed information associated with drips during the MODS, such as drivers that fail to enter drips. MODS entry notification is a _DSM function is invoked when information handling system 100 enters the sleep state of a MODS session. In an example, the sleep state may be defined as entry into the low power phase, when all ancillary system quiescing behavior has completed, and only explicitly allowed, user desired, value-adding software activity can run. For example, these activities may include, but are not limited to keyboard backlight, power button LED and fan turn off at this notification, as it indicates that larger workloads should be completed, and the system has officially entered its long-term sleep state.

The MODS exit notification may include detailed information associated with wake sources or configurations for the information handling system. OS 104 may provide these notifications to EC 102 in any suitable manner, such as via a ACPI communication to firmware service 120 of the EC. MODS exit notification is a _DSM function invoked when information handling system 100 exits from the sleep state of a MODS session. In an example, the exit may be defined as exit from the low power phase, where information handling system 100 is no longer in the explicit sleep state and may now allow larger workloads to run.

In certain examples, firmware service 120 of EC 102 may be a bare-metal service that may instruct host OS 102 to provide an ACPI event notification regarding the software drips state based on a query from the EC. Upon a next re-boot of information handling system 100, EC 102 may provide host software service 130 the detailed EC log information from the log in the memory to identify OS driver component prevented the wake from MODS 132. In an example, the driver component or device drivers 106 or 108 may also prevent the wake from a deeper low power state during MODS 132.

For example, if device driver 106 is an audio driver that prevents entry to MODS 132, EC 102 may capture this information from an enhanced drips logging. EC 102 or OS 104 may provide an individual associated with information handling system 100 that device driver 106 is breaking MODS 132. In another example, software service 13 may automatically go into device manager and disable the broken device driver 106. In an example, information handling system may search a cloud server for an update to the broken driver 106.

Figure 2:
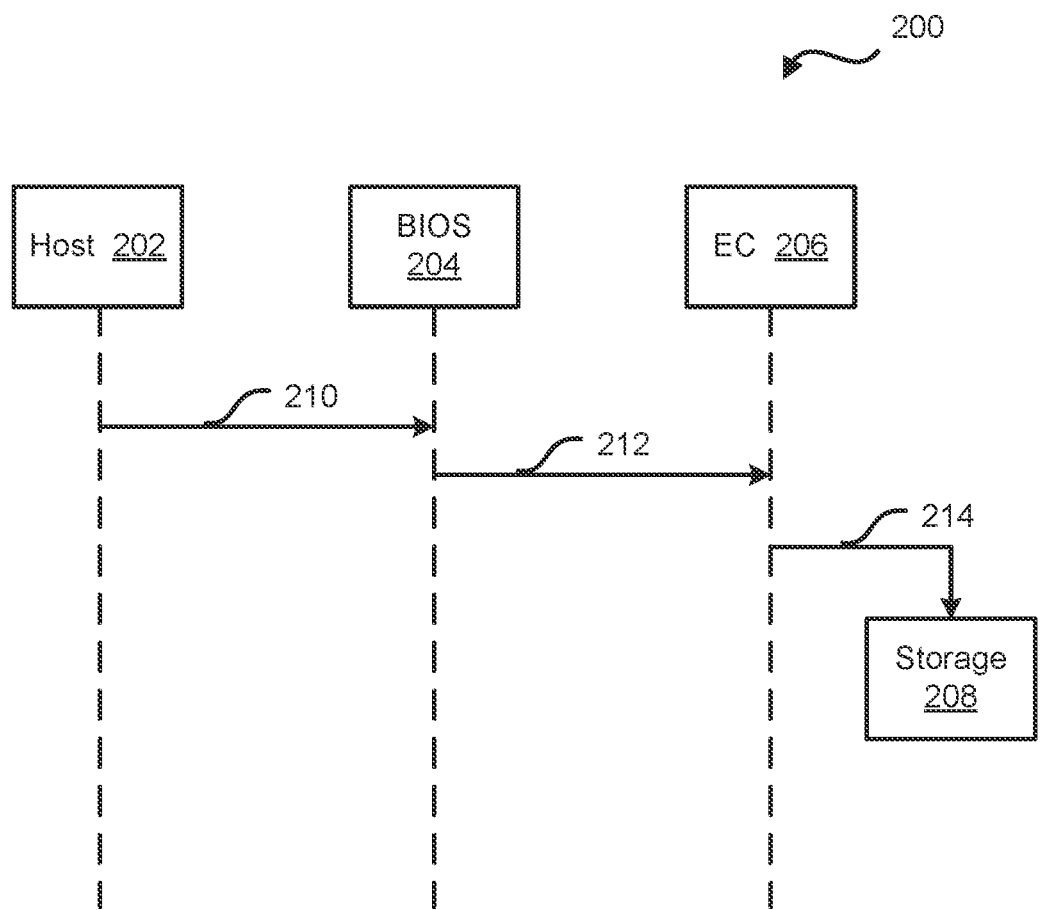
FIG. 2 is a flow diagram of a method for storing software deepest runtime identification platform states according to at least one embodiment of the present disclosure.

FIG. 2 is a flow of a method 200 for determining storing software deepest runtime identification platform states according to at least one embodiment of the present disclosure. The operations may be performed by any suitable components including, but not limited to, a host processor 202, a basic input/output system (BIOS) 204, an EC 206, and a storage 208. At operation 210, host processor 202 may collect OS power state transition details. In an example, the OS power state transition details may include critically important SW drips information, which in turn may allow EC 206 to pin-point problematic drivers during entry into MODS.

At operation 212, host processor 202 may provide the OS power state transition details to BIOS 204 via an ACPI object, such as _DSM. In response to receiving the OS power state transition details, BIOS 204 may provide the details to EC 206 at operation 214. In an example, the communication of the OS power state transition details may be provided from BIOS 204 to EC 206 via any suitable manner including, but not limited to, a firmware notification. At operation 216, EC 206 may log or store the OS power state transition details in storage 208. In certain examples, storage 208 may be any suitable memory, such as a SPI flash memory or other non-volatile random access memory.

Figure 3:
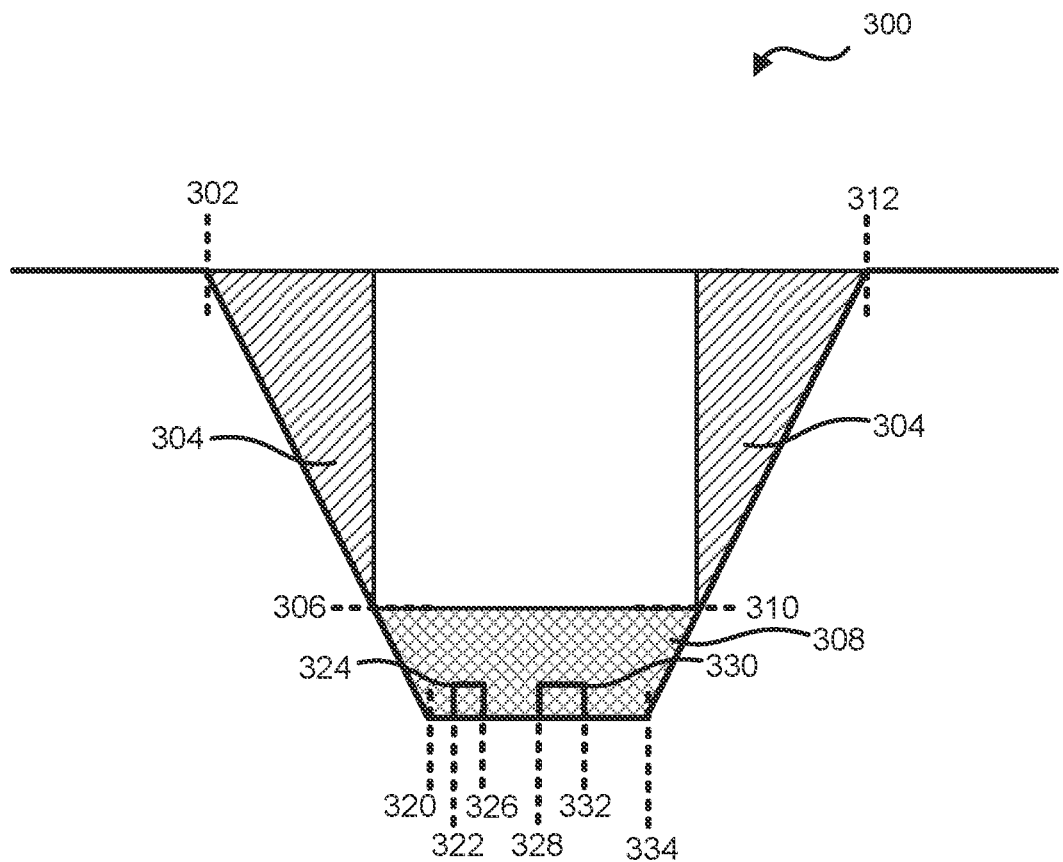
FIG. 3 is a modern standby diagram according to at least one embodiment of the present disclosure.

FIG. 3 illustrates a modern standby diagram 300 according to at least one embodiment of the present disclosure. At point 302, a display of an information handling system is turned off. In certain examples, the display may be turned off response to any suitable operation including, but not limited to, an individual pressing a power button of the information handling system, the individual closing a lid of the information handling system, the individual selecting 'Sleep' from a soft power button in a settings menu, and the OS of the information handling system idling out. In response to the display being turned off, the OS enters into one or more phases while the screen is off within section 304. In certain examples, a phase may include, but not limited to, a no CS phase, a connection phase, a presence phase, a process lifetime manager (PLM) phase, a maintenance phase, and a desktop activity moderator (DAM) phase.

After the OS proceeds through these phases with the screen off in section 304, the OS may enter into a sleep state at point 306. In an example, while the OS is in the sleep state, as indicated by section 308, the OS or information handling system may enter into one or more additional phases. These phases may include, but are not limited to, a low power phase, a resiliency notification phase, and a resiliency phase. At point 310, the OS may exit the sleep state, but the screen may continue to be off as indicated by section 304. Then at point 312, the display may be turned on.

In certain examples, while the OS is in the sleep state of MODS, one or more software drips may be entered into or exited from. For example, a software drips may be entered at point 320, and the software drips may be exited at point 322. After the software drips was exited, the software, such as the OS, may enter a slightly higher power state to perform any explicitly allowed activity 324. When the activity is completed, a software drips is entered at point 326, and the software drips may be exited at point 328. After the software drips was exited, the software may enter the slightly higher power state to perform another explicitly allowed activity 330. When the activity is completed, a software drips is entered at point 332, and the software drips may be exited at point 334. In an example, after the software drips exit at point 334, the OS may enter different phases until the sleep state is exited at point 310. These phases may include, but are not limited to, the resiliency phase, the resiliency notification phase, and the low power phase.

Figure 4:
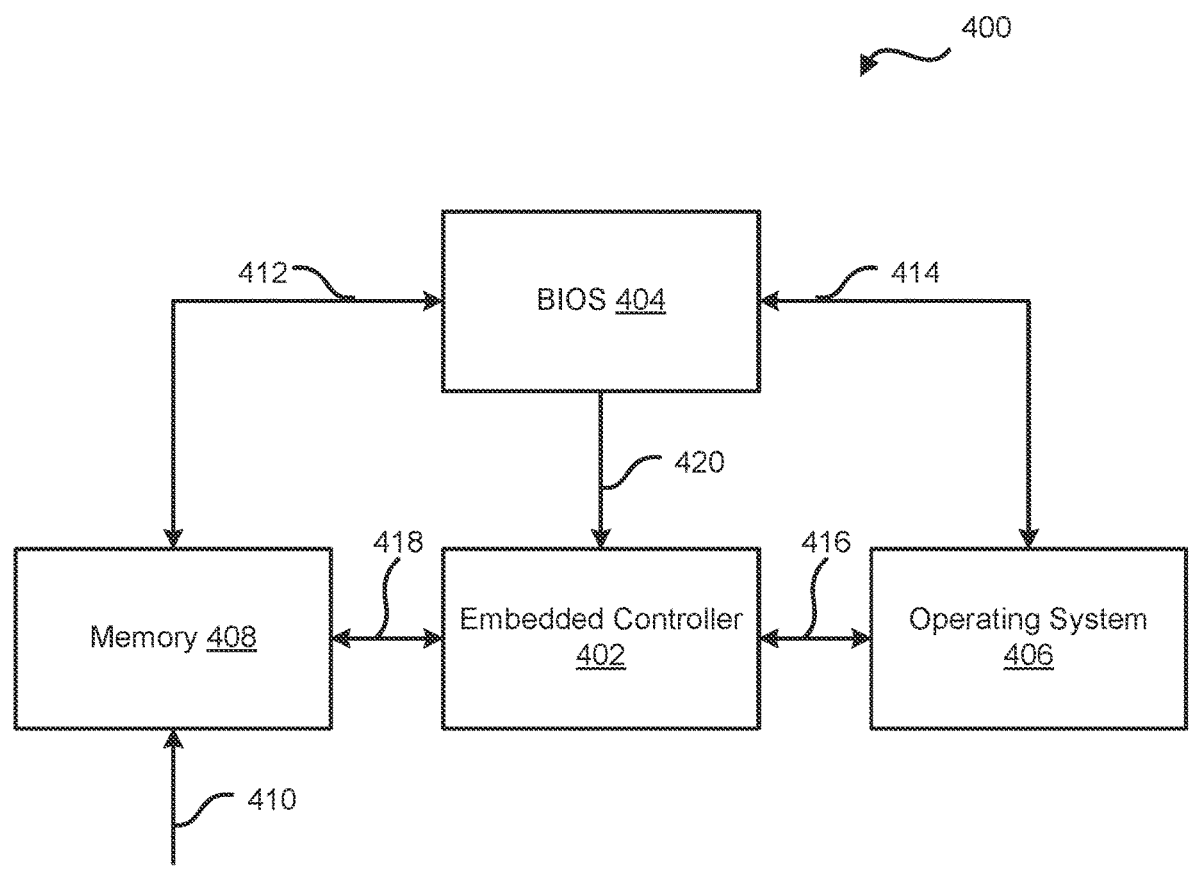
FIG. 4 is a block diagram of a portion of an information handling system according to at least one embodiment of the present disclosure.

FIG. 4 illustrates a portion of an information handling system 400 according to at least one embodiment of the present disclosure. Information handling system 400 may be substantially similar to information handling system 100 of FIG. 1 and information handling system 600 of FIG. 6. Information handling system 400 includes an EC 402, a basic input/output system (BIOS) 404, an OS 406, and a memory 408. Memory 408 may be any suitable type of memory, such as a SPI flash memory. Information handling system 400 may include any suitable number of additional components or information handling systems without varying from the scope of this disclosure.

In an example, EC 402, BIOS 404, OS 406, and memory 408 may perform different operations to provide enhance diagnosis and remediation of power state change failures within information handling system 400. In certain examples, different communications with different communication protocols may take place within information handling system 400. For example, power state S5 telemetry may be provided to memory 408 on a communication interface 410, BIOS 404 may communicate with the memory through a pre-boot fetch command over a communication interface 412. In an example, the pre-boot fetch command may be provided via a serial peripheral platform controller hub interface (SPI_PCH) communication protocol. Communication between BIOS 404 and OS 406 may be provided by an ACPI table over a communication interface 414. EC 402 and OS 406 may be coupled via a communication interface 416, and the EC may be coupled to memory 408 via a communication interface 418. In an example, a communication protocol over communication interface 418 may be a MMIO communication protocol. BIOS 404 may communicate with EC 402 over a communication interface 420. In an example, a communication protocol over communication interface 420 may be a mailbox (MBOX) communication protocol. Communication between EC 402, BIOS 404, OS 406, and memory 408 will be described with respect to FIG. 5 below.

Figure 5:
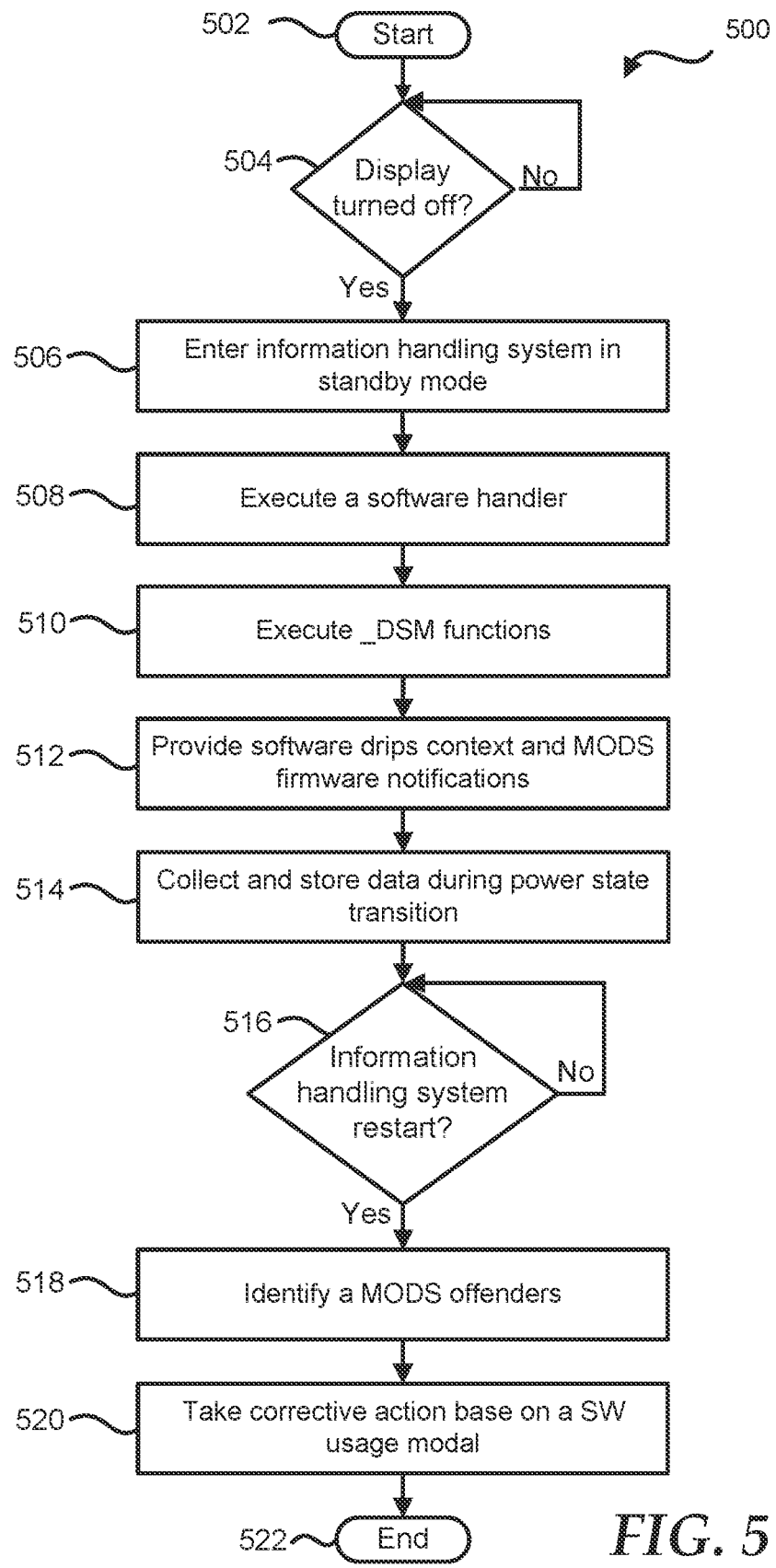
FIG. 5 is a flow diagram of a method for performing corrective actions based on a modern standby offender according to at least one embodiment of the present disclosure.

FIG. 5 illustrates a flow of a method 500 for performing corrective actions based a modern standby offender according to at least one embodiment of the present disclosure, starting at block 502. In an example, method 500 may be performed by any suitable component including, but not limited to, embedded controller 102 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 504, a determination is made whether a display of an information handling system has been turned off. In certain examples, the display may be turned off response to any suitable operation including, but not limited to, an individual pressing a power button of the information handling system, the individual closing a lid of the information handling system, the individual selecting 'Sleep' from a soft power button in a settings menu, and the OS of the information handling system idling out.

In response to the display being turned off, the information handling system is entered into a MODS at block 506. In an example, the MODS may be any low power state S1-S5 and may include any different phase within these low power states. For example, information handling system may enter into any suitable phase of including, but not limited to, a no CS phase, a connection phase, a presence phase, a process lifetime manager (PLM) phase, a maintenance phase, a desktop activity moderator (DAM) phase, a low power phase, a resiliency notification phase, and a resiliency phase.

At block 508, a handler is executed within an OS. In an example, a software service within the host OS may execute the handler. At block 510, _DSM function is executed. At block 512, software drips context and MODS firmware notifications are provided. In an example, the software drips context and MODS notifications may be provided by the software service of the OS, such as OS 406 of FIG. 4, to a firmware service of an EC, such as EC 402 of FIG. 4, within the information handling system.

At block 514, data associated with MODS entry and exit are collected and stored. In certain examples, the data may be collected during a power state transition and may include _DSM functions within OS 406. In an example, EC 402 of the information handling system may collect the data from the software service of OS 4060 and may store or log the data in memory 408 of FIG. 4, such as a SPI flash device. The data may include any suitable level of granularity of context data associated with OS 406 not being able to enter/exit MODS. In certain examples, the data may indicate that OS 406 never exited the MODS and may further include a snapshot of a process or service running in the background when the OS attempted to enter MODS.

At block 516, a determination is made whether the information handling system has performed a restart. In response to the restart, one or more MODS offenders are identified at block 518. In an example, the MODS offenders may be drivers that prevent the entry/exit of MODS. For example, a MOD offender may be a device driver running in the background when OS 406 was attempting to enter MODS and this device driver prevented the entry in MODS. A MODS offender may also be a driver that was not able to enter a standby mode.

At block 520, corrective action is taken, and the flow ends at block 522. In an example, a software usage model may determine the corrective action. In certain examples, EC 402 of the information handling system may retrieve from memory 408 the context data associated with a reason the OS was not able to enter/exit MODS. EC 402 may provide this context data, such as the MODS offender driver, to the software service of OS 402 after restart of the information handling system. In an example, BIOS 404 may prefetch the context data from memory 408 during the restart of information handling system and provide the data to OS 406 Based on the context data, the corrective action may be performed via an interface with an individual associated with the information handling system, automatically by a software server, via a remediation service on a backend server, or the like. In an example, the individual may turn off the device driver that prevented entry/exit of MODS. In another example, the software service may automatically disable the offending device driver. A processor in a backend server may push the corrective action to the information handling system, which in turn may perform the corrective action, such as disabling the device driver.

FIG. 6 shows a generalized embodiment of an information handling system 600 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632 and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 4394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612 or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600.

Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a storage device configured to store context data associated with a standby mode for the information handling system; and
    an embedded controller configured to communicate with the storage, the embedded controller configured to:
        receive the context data from a host operating system of the information handling system, wherein the context data includes data associated with a software deepest runtime identification platform state;
        store the context data in the storage device;
        in response to a restart of the information handling system, the embedded controller further configured to:
            based on the context data, determine a device driver that prevented the information handling system from exiting the standby mode; and
            provide an identifier of the device driver to a software service of the host operating system.

2. The information handling system of claim 1, wherein the information handling system further includes a processor, the processor configured to:
    execute the host operating system;
    perform a corrective action based on a failure of the information handling system from exiting the standby mode.

3. The information handling system of claim 2, wherein the processor is further configured to: receive the corrective action from a backend server.

4. The information handling system of claim 2, wherein the corrective action is based on a selection via a user interface.

5. The information handling system of claim 2, wherein the corrective action includes the processor configured to: disable the device driver.

6. The information handling system of claim 1, wherein the software deepest runtime identification platform state occurs during a sleep state of the information handling system.

7. The information handling system of claim 6, wherein only explicitly allowed activities are allowed to cause the information handling system to exit the software deepest runtime identification platform state.

8. The information handling system of claim 1, wherein the standby mode is a modern standby within the information handling system.

9. A method comprising:
    receiving, by an embedded controller of an information handling system, context data from a host operating system of the information handling system, wherein the context data includes data associated with a software deepest runtime identification platform state;
    storing, in a storage device of the information handling system, the context data; and
    in response to a restart of the information handling system:
        based on the context data, determining a device driver that prevented the information handling system from exiting a standby mode; and
        providing an identifier of the device driver to a software service of the host operating system.

10. The method of claim 9, further comprising:
    executing, by a processor of the information handling system, the host operating system; and
    performing, by the processor, a corrective action based on a failure of the information handling system from exiting the standby mode.

11. The method of claim 10, further comprising: receiving the corrective action from a backend server.

12. The method of claim 10, wherein the corrective action is based on a selection via a user interface.

13. The method of claim 10, wherein the corrective action includes the processor configured to: disable the device driver.

14. The method of claim 9, wherein the software deepest runtime identification platform state occurs during a sleep state of the information handling system.

15. The method of claim 14, wherein only explicitly allowed activities are allowed to cause the information handling system to exit the software deepest runtime identification platform state.

16. The method of claim 9, wherein the standby mode is a modern standby within the information handling system.

17. An information handling system comprising:
    a storage device configured to store context data associated with a standby mode for the information handling system;
    an embedded controller configured to communicate with the storage, the embedded controller configured to:
        receive the context data from a host operating system of the information handling system, wherein the context data includes data associated with a software deepest runtime identification platform state, wherein the software deepest runtime identification platform state occurs during a sleep state of the information handling system;
        store the context data in the storage device;
        in response to a restart of the information handling system, the embedded controller further configured to:
            based on the context data, determine a device driver that prevented the information handling system from exiting the standby mode; and
            provide an identifier of the device driver to a software service of the host operating system; and
    a processor in communication with the embedded controller, the processor configured to:
        execute the host operating system;
        perform a corrective action based on a failure of the information handling system from exiting the standby mode, wherein the corrective action is to disable the device driver.

18. The information handling system of claim 17, wherein the processor is further configured to: receive the corrective action from a backend server.

19. The information handling system of claim 17, wherein only explicitly allowed activities are allowed to cause the information handling system to exit the software deepest runtime identification platform state.

20. The information handling system of claim 17, wherein the standby mode is a modern standby within the information handling system.

\* \* \* \* \*